United States Patent [19]

Sakurai

[11] Patent Number: 4,773,673
[45] Date of Patent: Sep. 27, 1988

[54] MECHANISM FOR RELEASING A LATCH OF AIR BAG DOOR

[75] Inventor: Hideyuki Sakurai, Toyota, Japan

[73] Assignee: Toyota Jidosha Kabushiki Kaisha, Toyota, Japan

[21] Appl. No.: 136,651

[22] Filed: Dec. 28, 1987

[30] Foreign Application Priority Data

Dec. 22, 1986 [JP] Japan .................. 61-197085[U]

[51] Int. Cl.$^4$ ............................................ B60R 21/00
[52] U.S. Cl. .................................................. 280/732
[58] Field of Search .................... 280/728, 732, 743

[56] References Cited

U.S. PATENT DOCUMENTS 3,643,971 2/1972 Kushnick ............................ 280/732
3,708,179 1/1973 Hulten ................................ 280/732

FOREIGN PATENT DOCUMENTS 2425659 12/1975 Fed. Rep. of Germany ...... 280/732
50-102027 8/1975 Japan .

Primary Examiner—Ross Weaver
Attorney, Agent, or Firm—Cushman, Darby & Cushman

[57] ABSTRACT

A mechanism for releasing a latch of a door covering an air bag container having a latching unit provided on an air bag door attached through a hinge to an instrument panel of a vehicle at the opposite side to the hinge, a cylinder body mounted near a latching lever in the latching unit and set in an attitude that the latching lever is operated in a latch releasing direction in case of releasing the latching unit by a rod telescoped in the cylinder, an air bag inflater formed with other passage for introducing part of gas generated in the inflater out of the air bag, the other passage being connectd to a vacant chamber at the opposite side to the rod of the cylinder. Since the mechanism releases the latch of the door by operating the cylinder unit by means of gas generated from the inflater, the air bag door can be opened simultaneously at the time of inflation of the air bag. In case of an inspection, the air bag door may sufficiently be opened, but may not be disassembled.

7 Claims, 5 Drawing Sheets

MECHANISM FOR RELEASING A LATCH OF AIR BAG DOOR

BACKGROUND OF THE INVENTION

The present invention relates to a mechanism for releasing the latch of a door covering a doorway in an air bag container for containing an air bag.

An air bag containing apparatus for containing an air bag which is inflated to restrain an occupant's body when a vehicle is abruptly decelerated is sometimes installed on or near an instrument panel in the vehicle.

An example of such an air bag containing apparatus is disclosed in Japanese Utility Model Laid-open No. 102027/1975.

In the air bag containing apparatus disclosed in Japanese Utility Model Laid-open No. 102027/1975, its cover is released by the inflating strength of an air bag to disassemble a container body. Thus, a force for fixing the cover to the container body must be regulated to be complicated. Since the cover and the like is further projected outside the container body, an occupant might erroneously open the cover.

The container is formed of disassemblable pedal-like members which are restricted by the cover. When the cover is removed at the time of inspecting the air bag in the container, the container is also disassembled. Therefore, the container must be assembled after the inspection, and the inspecting work must be thus complicated.

SUMMARY OF THE INVENTION

Accordingly, one object of the present invention is to provide a mechanism which can release a latch of an air bag door without utilizing inflating strength of the air bag. Another object of the present invention is to provide a mechanism which prevents that an occupant can open a cover erroneously. Further object of the present invention to provide a mechanism which makes an inspection of the air bag easy.

In order to achieve the above objects, there is provided according to the present invention a mechanism for releasing a latch of an air bag door pivotally mounted on vehicle body and covering an air bag container comprising a latching unit provided on an inner side of the air bag door and having a latching lever being engagable with the vehicle body, a cylinder unit having a cylinder, a piston slidable in the cylinder and a rod provided with the piston, the cylinder being mounted on the vehicle body, the latching lever being released from the vehicle body in case that the rod is protruded from the cylinder, an inflater formed with a passage for introducing part of gas generated in the inflater into the cylinder, the passage being connected to a vacant chamber at the opposite side to the rod of the cylinder.

In the constitution of the mechanism of the invention, the air bag door is tightly closed by the latching lever of the latching unit in an ordinary state of the vehicle.

The inflater is operated in the time of an emergency of the vehicle, and part of gas generated in the inflater is introduced through other passage out of the air bag into a vacant chamber at the opposite side to the rod of the cylinder. Thus, the rod of the cylinder is protruded toward the latching lever of the latching unit to push the lever, thereby releasing the latching unit.

Thus, the start of inflating the air bag and the release of the air bag door are almost simultaneously conducted, and the air bag can be smoothly and rapidly inflated without being obstructed by the air bag door.

The air bag door is latched by the latching lever of the latching unit. Thus, the latching lever can be manually moved at the time of inspecting the air bag to release the latching unit. After the inspection, the air bag door may sufficiently be simply closed.

In this manner, the air bag apparatus can be simply inspected.

BRIEF DESCRIPTION OF DRAWINGS

The above and other related objects and features of the invention will be apparent from a reading of the following description of the disclosure found in the accompanying drawings and novelty thereof pointed out in the appended claims.

DESCRIPTION OF THE PREFERRED EMBODIMENTS

Figure 1:
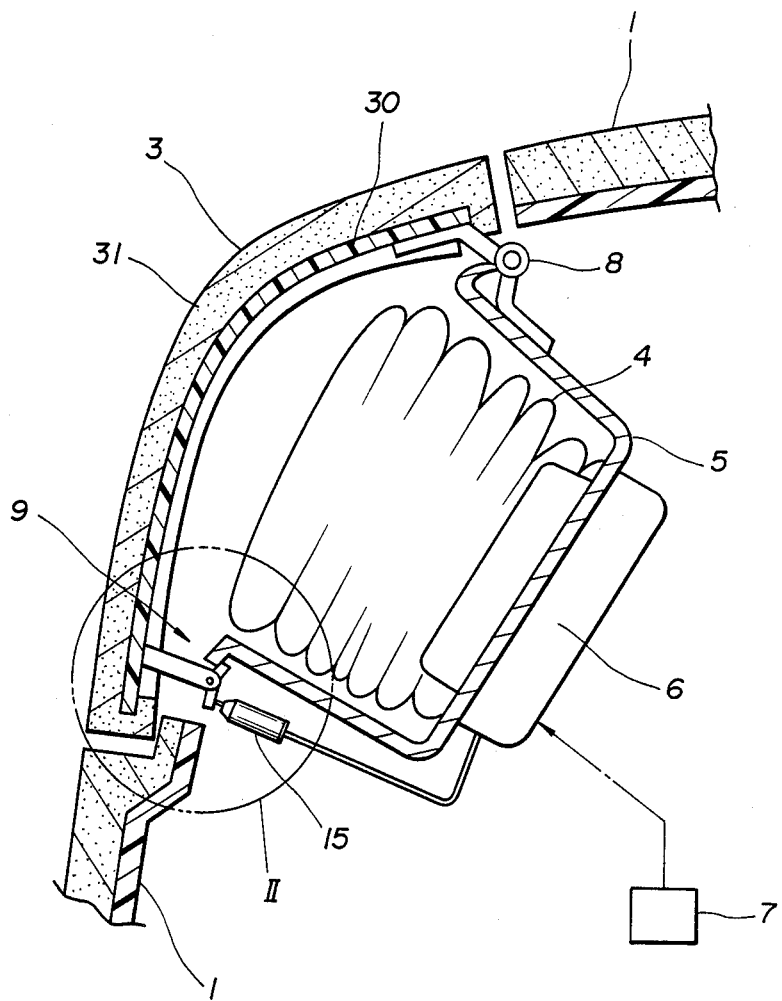
FIG. 1 is a sectional view taken along the line I—I of FIG. 6 showing a mechanism for releasing the latch of an air bag door covering an air bag container together with an air bag apparatus according to the present invention.

This invention will now be described in detail with reference to FIGS. 1 to 9, which show an embodiment of a mechanism for releasing the latch of a door covering an air bag container for containing an air bag for a vehicle according to this invention.

In the drawings, reference numeral 1 generally designates an instrument panel of a vehicle. An air bag door 3 is arranged on the instrument panel 1, so that the both form a continuous surface, and the air bag door is opposed to a passenger seat 2 in a compartment of the vehicle.

A container 5 for containing an air bag 4 folded therein is installed to the vehicle body and the air bag door 3 is secured to the container so as to cover the air bag 4.

The air bag 4 is known and an inflater 6 is attached to the base of the container 5, and the air bag 4 is attached to the inflater 6. The inflater 6 is electrically connected to a vehicle deceleration sensor 7 provided an appropriate place of the vehicle body in the same manner as the conventional one.

The air bag door 3 is coupled at its upper portion by a hinge 8 to the container 5, and engaged at its lower portion with the container 5 through a latching unit 9.

In the arrangement described above, when the air bag door 3 is opened at the time of inflating the air bag 4, the air bag door 3 is upwardly rotated at the hinge 8.

Figure 2:
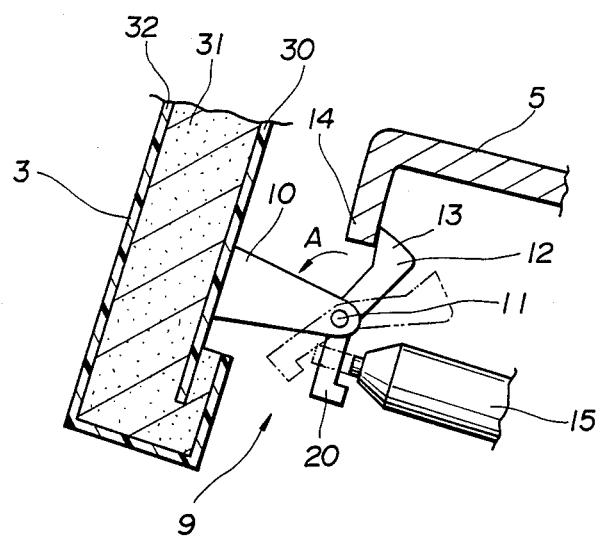
FIG. 2 is an enlarged sectional view showing the portion II of FIG. 1 showing a latching unit.

The latching unit 9 has, as shown in FIG. 2, a pair of arm 10 fixedly secured at its base end substantially perpendicularly to the inner surface of the air bag door 3, a shaft 11 engaged with the other end portion of the arm 10, a latching lever 12 pivotally secured at its intermediate portion to the shaft 11.

Figure 8:
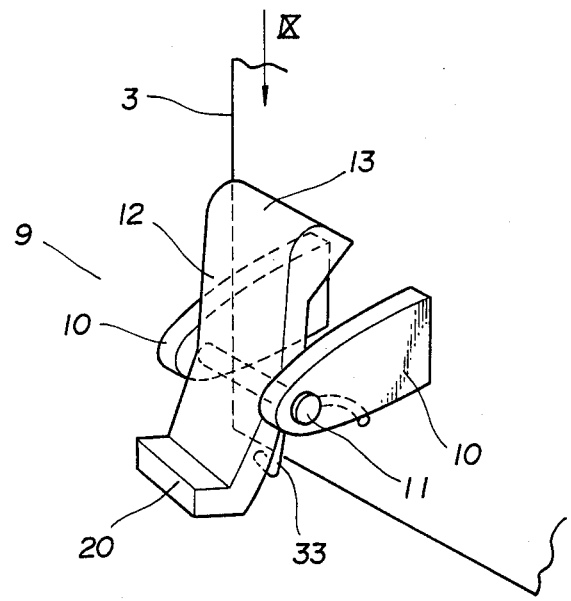
FIG. 8 is a perspective view of the latching unit.
Figure 9:
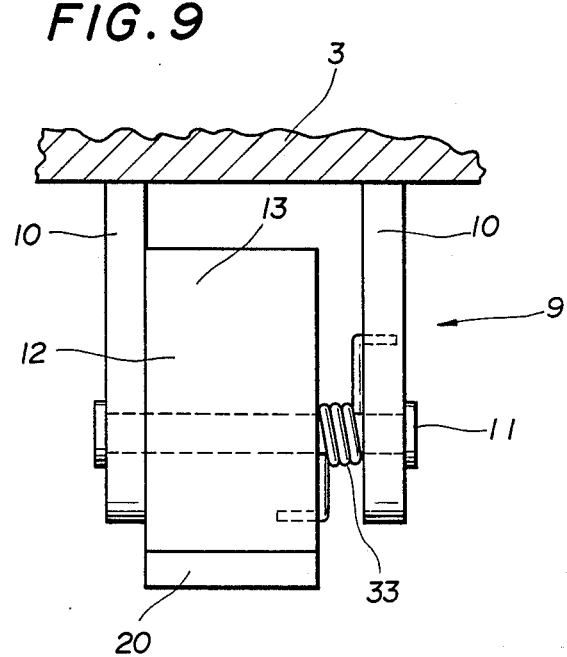
FIG. 9 is a view showing the latching unit as seen from a direction of an arrow IX in FIG. 8.

A coiled spring 33 is arranged, as shown in FIGS. 8 and 9, around the rotational shaft 11, and is engaged at its one end to the arm 10 and at its other end to the latching lever 12, therefore the latching lever 12 is rotatably biased in a direction as designated by an arrow A in FIG. 2 and an upper portion 13 of the latching lever 12 is engaged with the edge 14 of the container 5.

Consequently, the air bag door 3 is latched to the instrument panel 1 in normal condition.

A cylinder unit 15 which constitutes a part of the mechanism for releasing the latch between the latching lever 12 and the air bag door 3 is installed in the vicinity of the latching lever 12.

Figure 3:
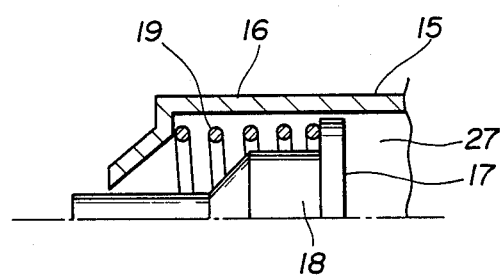
FIGS. 3 and 4 are sectional views by halves showing a cylinder before and after the telescoping operation.
Figure 4:
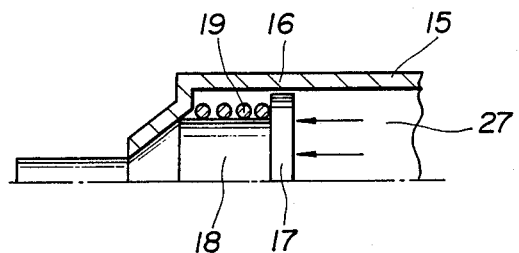

The cylinder unit 15 has, as shown in FIGS. 3 and 4, cylinder 16, a piston 17 slidably disposed in the cylinder 16, and a rod 18 fixedly secured at its one end to the piston 17. The end of the rod 18 is opposed to the lower portion 20 of the latching lever 12 and a coiled spring 19 is arranged around the rod 18 so as to alwaysbias the piston 17 inward of the cylinder body 15.

When the rod 18 of the cylinder unit 15 is slidably protruded from the cylinder 16 against the coiled spring 19 disposed therein as shown in FIG. 4, the latching lever 12 is rotated from the position designated by solid lines to the position designated by broken lines in FIG. 2, so that the upper portion 12 of the latching lever 12 is disengaged from the edge 14 of the container 5, as a result, the air bag door 3 becomes freely pivotally movable at the hinge 8.

Figure 5:
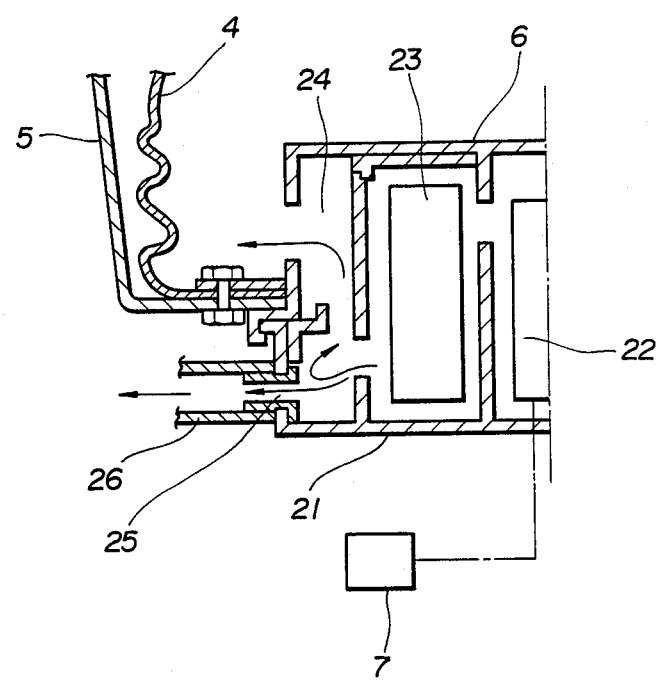
FIG. 5 is a sectional view by half showing an inflater.
Figure 6:
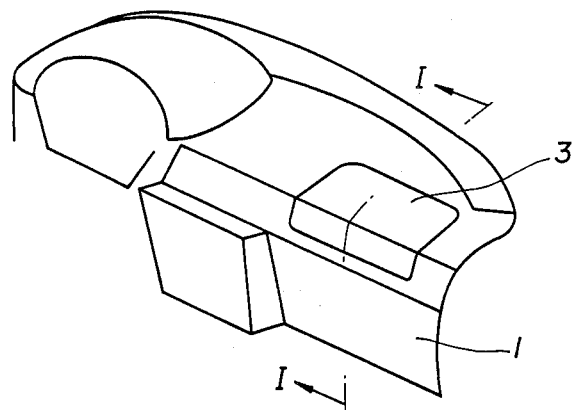
FIG. 6 is a perspective view of an instrument panel having an air bag door.
Figure 7:
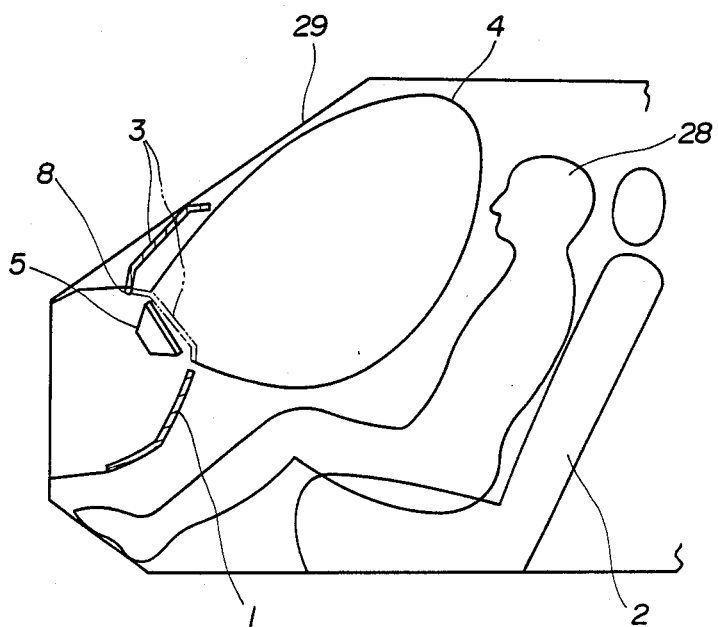
FIG. 7 is a vertical sectional view of a front portion of the vehicle.

The inflater 6 provided on the inside of container 5 has, as shown in FIG. 5, a substantially cylindrical case 21, a powder 22 filled in one side chamber thereof to be exploded in response to the operation, the vehicle deceleration sensor 7, and medicine 23 filled in an intermediate chamber thereof for generating gas in reaction by means of the explosion of the powder 22.

Air bag 4 is fixedly secured on the other periphery of the case 21 and the inside of the container 5. The inflater 6 further has a gas passage 24 formed adjacent to the intermediate chamber filled with the medicine 23 in the case 21 to communicate with the interior of the air bag 4, and the other passage 25 separated from the passage 24 for introducing part of the gas into the cylinder unit 15.

The passage 25 is connected by way of a conduit 26 to a vacant chamber 27 at the opposite side to the rod 18 of the cylinder unit 15.

Thus, when the inflater 6 starts operating in the time of an emergency of the vehicle, the latching lever 12 is simultaneously released or disengaged from the edge 14 of the container 5, and the air bag 4 starts inflating with the gas fed from the inflater 6.

In normal condition, the air bag 4 is contained in the container 5, and the air bag door 3 is tightly closed.

However, the vehicle deceleration sensor 7 operates in the time of an emergency of the vehicle, and transmits an operation signal to the inflater 6. Thus, the inflater 6 generates gas as described above to inflate the air bag 4 by the gas introduced from the inflater 6 thereto.

Simultaneously, part of the gas from the inflater 6 actuates the cylinder unit 15 to release the latch of the latching lever 12 as described above.

Therefore, the air bag 4 rotates the air bag door 3 at the hinge 8 while inflating the air bag 4 by the gas from the inflater 6 to protrude on the instrument panel 1, thereby preventing the occupant 28 sitting on the passenger seat 2 from colliding with the front window glass 29 and the like.

When the air bag apparatus is required to be inspected, an operator pivotally turns the latching lever 12 by hand to release the latch of the air bag door 3.

The air bag door 3 is constructed by laminating a foamable layer 31 and a skin member 32 on the base material 30 made of resin or metal plate in the same manner as the instrument panel 1.

According to the present invention, the mechanism for releasing the latch of the door of the air bag container is constructed and arranged as described above, and when the air bag starts inflating, the air bag door can be simultaneously opened as described above.

Therefore, the weight of the air bag door may be exerted merely to the air bag, and the air bag is smoothly and rapidly inflated without any disturbance.

When the latch of the door of the air bag container is released as described above, the air bag door can be pivotally opened, but the air bag container is not disassembled at this time as the conventional one.

Consequently, the air bag apparatus can be simply and rapidly inspected.

Further, the cylinder unit is actuated by utilizing the gas generated by the inflater. Thus, a drive source exclusive for the cylinder unit is not necessarily prepared, and the number of components and the weight of the vehicle body can be decreased.

Moreover, the mechanism for releasing the latch of the door of the air bag container is concealed within the air bag door arranged in the same plane as the instrument panel, the air bag door may not be erroneously opened by the occupant in the vehicle.

What is claimed is:

1. A mechanism for releasing a latch of an air bag door pivotally mounted on vehicle body and covering an air bag container comprising:
    a latching unit provided on an inner side of the air bag door and having a latching lever being engagable with the vehicle body,
    a cylinder unit having a cylinder, a piston slidable in the cylinder and a rod provided with the piston, the cylinder being mounted on the vehicle body, the latching lever being released from the vehicle body in case that the rod is protruded from the cylinder,
    an inflater formed with a passage for introducing part of gas generated in the inflater into the cylinder, the passage being connected to a vacant chamber at the opposite side to the rod of the cylinder.

2. A mechanism for releasing the latch of a door covering an air bag container according to claim 1, wherein said air bag door is pivotally coupled at the upper portion thereof by a hinge to the instrument panel and is engaged at the lower portion thereof through the latching unit.

3. A mechanism for releasing the lock of a door covering an air bag container according to claim 2, wherein said air bag door comprises a skin member formed similarly to the instrument panel, and has therein a foamable layer.

4. A mechanism for releasing the latch of a door covering an air bag container according to claim 1, wherein said latching unit comprises a latching lever pivotally secured to the inner side of the air bag door, and the latching lever is biased by a spring toward an engaging member fixed to an edge of the air bag container.

5. A mechanism for releasing the latch of a door covering an air bag container according to claim 4, wherein said latching lever has an extended portion engaged with the engaging member, and the rod of said cylinder unit is opposed oppositely to the urging direction by the spring to the opposite side thereof.

6. A mechanism for releasing the latch of a door covering an air bag container according to claim 5, wherein rod of said cylinder unit is biased by the spring disposed in the cylinder unit in a direction separating from the latching lever.

7. A mechanism for releasing the latch of a door covering an air bag container according to claim 1, wherein said latching unit and said cylinder unit are covered by the air bag door

* * * * *